United States Patent
Hunnicutt, Jr.

[11] 3,713,083
[45] Jan. 23, 1973

[54] VLF ACTIVE SONAR

[76] Inventor: William R. Hunnicutt, Jr., 3301 P Street, N.W., Washington, D.C.

[22] Filed: July 28, 1960

[21] Appl. No.: 46,035

[52] U.S. Cl. ................ 340/3 R, 340/3 FM, 340/3 T
[51] Int. Cl. ........................................... G01s 9/66
[58] Field of Search .......... 340/3, 6, 16, 8, 1, 5, 7, 12, 340/17; 343/118, 100.6, 10, 17.5; 181/0.51, .53 W

[56] References Cited

UNITED STATES PATENTS

| | | | |
|---|---|---|---|
| 1,470,733 | 10/1923 | Hayes | 340/16 |
| 1,735,460 | 11/1929 | Hahnemann | 340/6 |
| 2,009,451 | 7/1935 | Kunze | 340/6 |
| 2,019,497 | 11/1935 | Kuntze | 340/8 |
| 2,403,728 | 7/1946 | Loughren | 343/100 |
| 2,434,667 | 1/1948 | Mason | 340/16 |
| 2,464,276 | 3/1946 | Varian | 343/100 |
| 2,852,772 | 9/1958 | Gitzendanner | 340/16 |
| 2,632,150 | 3/1953 | Silverman et al. | 340/3 |
| 3,005,973 | 10/1961 | Kietz | 340/3 |
| 3,016,513 | 1/1962 | Van Dyke | 340/3 |

Primary Examiner—Richard A. Farley
Attorney—J. A. O'Connell, R. C. Reed and J. E. Holford

EXEMPLARY CLAIM

1. An underwater transducer system comprising a plurality of spaced substantially coplanar fluids wave transducers constructed and arranged to transmit fluid wave energy parallel to a common plane, said transducers including faired housing means for reducing fluid friction as said transducers are moved in a given direction parallel to said plane transmitting means coupled to said transducers for supplying frequency modulated output signals thereto over a preselected frequency range, receiving means coupled to said transducers for detecting and displaying the frequency of subsequent reflected signals as a function of time, said transducers being spaced by at least a quarter-wavelength at the lowest frequency in said preselected range.

3 Claims, 5 Drawing Figures

PATENTED JAN 23 1973  3,713,083

INVENTOR
WILLIAM R. HUNNICUTT, JR.

John E. Holford Agent
BY Richard C. Reed
ATTORNEY

VLF ACTIVE SONAR

The invention described herein may be manufactured and used by or for the Government of the United States of America for governmental purposes without the payment of any royalties thereon or therefor.

The present invention relates to sound transducers, particularly transducers operating at low frequencies below, for example, three kilocycles in a fluid medium such as water.

In sound transducers used for underwater exploration it is desirable to radiate and receive wave energy into the water in a beam having as narrow an angular width as practicable. Beam width is a function of the physical dimensions of the transducer, being most narrow when the radiating face is large compared to wave length of the sound energy in the adjoining medium. Hence, the use of high frequency, short wavelength transducer arrays has been preferred. Experience has shown, however, that high-frequency arrays operate satisfactorily only over relatively short distances. Low frequency systems, on the other hand, appear to have a much greater range for the same radiated power and are not affected as much by physical changes in the water.

To obtain satisfactory beam patterns at low frequencies it has been found necessary to use very large transducers. The chief problem, therefore, has been in the mounting and transporting of these transducers. The trend has been to use "broadside" arrays towed deep beneath the water surface and trained by various mechanical devices. The fluid friction, weight and moment of inertia of low frequency arrays, however, makes such systems very cumbersome.

An object of the present invention is therefore to provide a low frequency rapid scanning sonar system with high resolution which is easily transported.

Another object of the invention is to provide novel low frequency underwater transducer structures based on the "end fire" type of array.

These and other objects of the invention will be best understood with reference to the accompanying drawings wherein.

Figure 1:
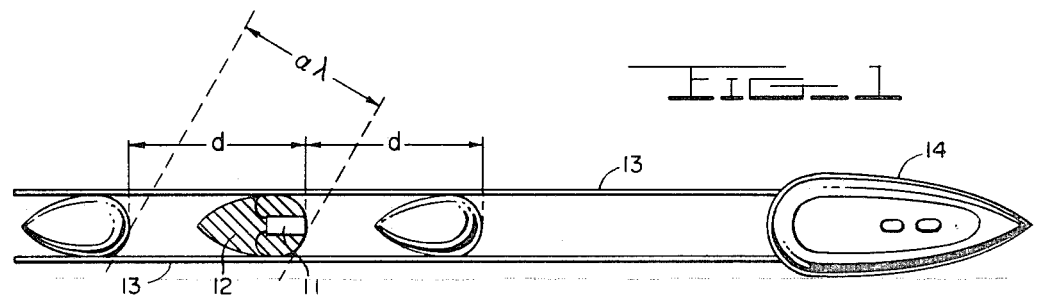
FIG. 1 shows one embodiment of sonar system with a towed transducer array of the invention.

Referring more specifically to FIG. 1 there is shown one possible embodiment of the invention. This embodiment comprises a plurality of low frequency transducers 11 such as are disclosed, for example, in the patent applications Ser. No. 278,726 filed Feb. 26, 1952 and Ser. No. 611,798 filed, Sept. 24, 1956 by John Chervenak. The transducers shown are single ended with the radiating and/or receiving face normal to the direction of movement as indicated by the arrow. The remaining faces are surrounded by a housing 12 shaped to reduce fluid friction and turbulence as the transducers are towed. The transducers are joined by suitable connecting structure, such as tubes 13, which may also carry electrical conductors to transmit signals to or from the transducers. The connecting structure is attached at one end to a tow ship 14 which provides the necessary locomotion.

Figure 2:
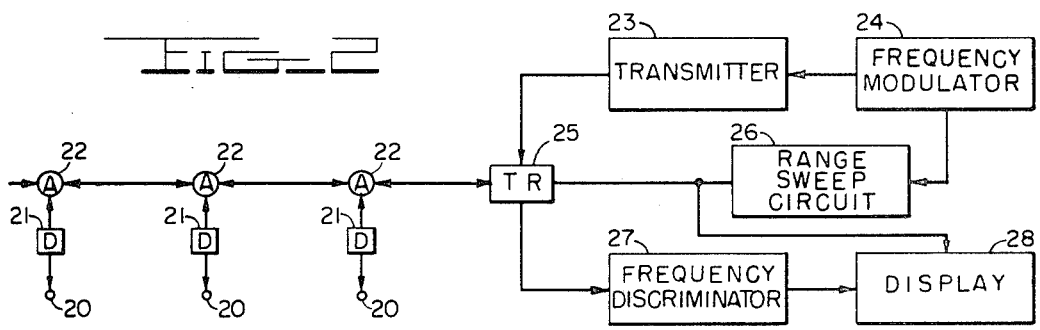
FIG. 2 shows a block diagram of the pulse-echo generating and receiving system of FIG. 1.

FIG. 2 shows in block diagram a pulse echo system employed with the structure shown in FIG. 1. The output of each transducer is applied to one terminal 20 of the receiver. The signal from the transducer at one end of the array in FIG. 1, for example the end nearest the tow ship, is combined with a second signal from the next closest transducer, each signal having passed through a suitable delay structure 21. Examples of this type of structure may be found in Terman's publication Radio Engineers Handbook published by McGraw Hill in 1943. The combination is made in a summer 22 which may consist of a resistive network, hybrid coil, or dual input amplifier. The signal from each of the succeeding inputs in combined with those preceding by a similar arrangement.

As is well understood in the art, the spacing between the transducers and relative delays between the signals coupled to or from the transducers provides a directional characteristic to the array which varies rapidly with the operating frequency. For example if the distance $d$ shown in FIG. 1 is one-half a wavelength of a first sound frequency and the delay structures 21 provide a half cycle delay or inversion of the signal, the array becomes "endfire" and is much more sensitive to signals of this first frequency propagating parallel to the tubes than a signal of similar strength and direction, but slightly different in frequency. If the spacing and delay structures 21 are designed to be a quarter wavelength or cycle of the first frequency, the array is again "endfire" and will further discriminate against one direction of propagation parallel to the rods. A second frequency having a wavelength $\lambda$ will be preferred by the receiver, if the incoming wavefronts which simultaneously strike successive transducers are at an angle such that the distance between these wavefronts is a $\lambda$, where $a$ is the same fraction of a wavelength at the second frequency that $d$ represents at the first frequency. Since this selectivity affects both radiation and reception, such an array when employed as part of a pulse-echo system may be used to determine the azimuth of a target by the spectrum of the echo it produces.

To make use of this property the system in FIG. 2 is provided with a transmitter 23 which in turn is controlled by a frequency modulator 24, the latter being a simple motor-driven mechanical arrangement or an electronic circuit of the type discussed in Sec. 7, Par. 16 of the Terman publication previously mentioned. The transmitter 23 is connected to the transducer terminals 20 through a TR switch for a short period at the beginning of each cycle of the range sweep circuit 26. This period will generally be sufficient to permit a complete sweep of the frequency range by the modulator 24, and, if greater accuracy is desired, the initiation of the range sweep may be synchronized with a given part of the modulator's cycle. The TR switch is double poled so that between transmissions the transducers are connected to a frequency discriminator 27. The output of the discriminator 27 is applied to a suitable display device 28 such as a cathode ray tube. A signal from the range sweep circuit 26 is also fed to the display unit to correlate the range and angle data available.

In operation the TR switch opens and admits the constantly varying frequency pulse from the transmitter. The pulse energy is radiated at various angles from the array according to the instantaneous frequency. If a target is present it returns a signal composed chiefly of the frequency components corresponding to its azimuth. The array further discriminates in favor of the frequency components as the signals are returned to the TR switch.

The receiver circuit, having been completed by this time, passes the received signal to the discriminator which converts the frequency pulse to an analog signal, as for example, a dc voltage pulse having an amplitude dependent on frequency. This pulse may be used to operate the vertical sweep of the cathode ray tube or similar device while the range circuit operates the horizontal sweep. Suitable calibration permits accurate reading of both range and angle for any number of targets. Since the angular readings are the same for targets located to either the port or starboard areas, it may be necessary to vary the angle of the transducer slightly to identify the proper area.

Figure 3:
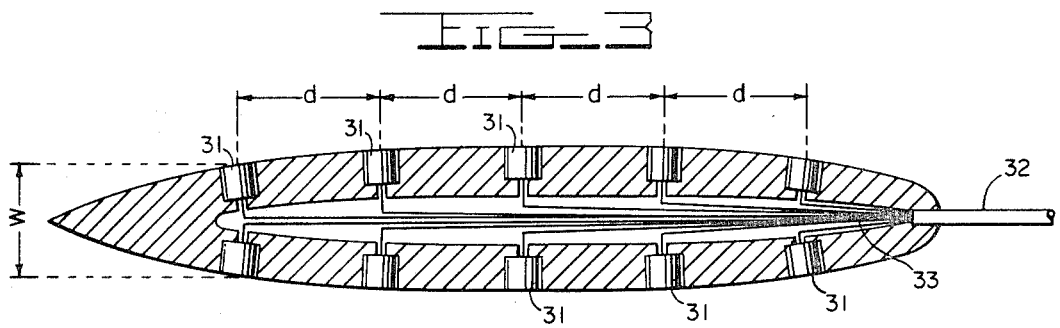
FIG. 3 shows another embodiment of the towed array structure of the invention.

Another array structure is shown in FIG. 3. In this structure the transducers 30 are surrounded by a single housing 31. The exterior surface is shaped to reduce fluid friction and turbulence as the housing is towed endwise. A tow cable 32 is anchored in one end of the housing and preferably carries the electrical wiring 33 which branches off in the housing to the various transducers. The transducers are preferably equally spaced, although other arrangements are possible. The array may be transported on or in the tow-ship (not shown) and ejected when needed. The same is true of the transducer in FIG. 1.

Figure 4:
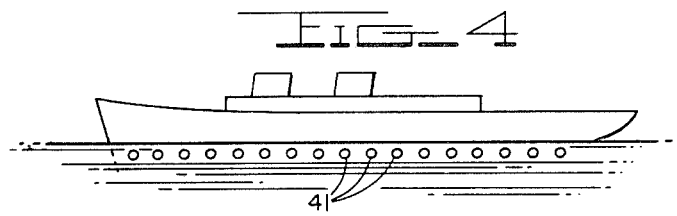
FIG. 4 shows another embodiment of the sonar system of the invention.

FIG. 4 shows still another embodiment of the invention wherein an array of transducers 41 is integrally mounted on the hull of a ship. The transducers are mounted below the waterline on one or both sides of the ship. The transducers nearest the ends of the ship, which are liable to receive noise due to turbulence at the bow or the propellers at the stern, may be omitted. This arrangement can also be used on submarines and torpedoes.

The structure in FIGS. 3 and 4 will generally have a small lateral dimension $w$ between opposed transducer faces as compared with the dimension $d$ and, therefore, must be driven in-phase to prevent mutual interference. Single transducers are available with opposed faces which have such phasing, and in some cases one of these may be substituted for each opposed pair of transducers 31 or 41. To employ a second class of transducers, also well known in the art, which have opposed anti-phased radiating faces, it will be generally necessary to employ a baffle.

Figure 5:
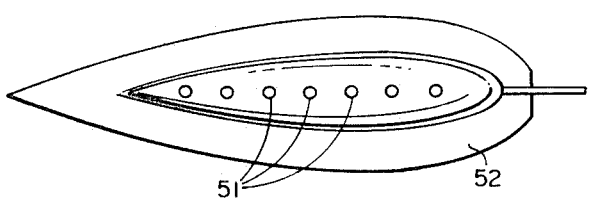
FIG. 5 shows a further embodiment of the towed array structure of the invention.

As shown in FIG. 5 the baffle 52 comprises a thin planar member extending from the transducer housing into the surrounding fluid medium. This member intercepts all of the short fluid paths between the opposed transducer faces greatly reducing the coupling therebetween. The baffle consists of highly absorptive and/or reflective material. Metals or plastics with occluded gas pockets are often used for such baffles. Rubber with metal particles dispersed therein are also satisfactory.

The housings themselves provide a possible path for interfering waves. The housings, therefore, should also be provided with reflecting walls and/or sound-absorbing interior. A gas filling will provide the former and foam rubber or many commercially available sound absorptive materials will provide the latter. This housing and baffle construction with opposed transducer faces can also be incorporated in the embodiment of FIG. 1. The advantage of separate transducers as shown in FIG. 2 is that opposite sides can be energized alternately to determine whether the target is on the port or starboard side.

A number of these arrays can be stacked vertically or horizontally to provide a more concentrated pattern. Faired spacers should be used in such cases to maintain the relative positions between transducers in the arrays. Phasing between the arrays may be provided with delay structures and summers in the same manner as phasing is accomplished between the transducers within the arrays. Connecting structure between the transducers or arrays may be flexible or rigid as conditions require.

In a typical system each transducer may be a foot or so in diameter and weigh 20–50 lbs. With thirty or forty and more of these in one array the handling and towing problem becomes acute. The simple structures disclosed herein greatly simplify this problem. Another advantage of this system over arrays radiating in phase into a common plane is the reduction of cavitation or bubble formation which lowers the efficiency of the transducers. The arrays of the present invention permit insertion of wave energy at spaced portions in the wave conducting fluid thus allowing the energy to become dispersed before combination of the waves from the different portions takes place. High local stress concentrations in the fluid are therefore not created.

The system, by virtue of its various operating frequencies is very resistant to countermeasures. The same target can be scanned by a number of frequencies merely by varying the azimuth of the array.

Obviously many modifications and variations of the present invention are possible in the light of the above teachings. It is therefore to be understood that within the scope of the appended claims the invention may be practiced otherwise than as specifically described.

What is claimed is:

1. An underwater transducer system comprising a plurality of spaced substantially coplanar fluid wave transducers constructed and arranged to transmit fluid wave energy parallel to a common plane, said transducers including faired housing means for reducing fluid friction as said transducers are moved in a given direction parallel to said plane transmitting means coupled to said transducers for supplying frequency modulated output signals thereto over a preselected frequency range, receiving means coupled to said transducers for detecting and displaying the frequency of subsequent reflected signals as a function of time, said transducers being spaced by at least a quarter-wavelength at the lowest frequency in said preselected range.

2. A transducer system according to claim 1 wherein said faired housing means includes a separate faired housing for each transducer and a pair of spaced parallel, slender nonextensible coupling members for mounting each of said separate faired housings therebetween.

3. A underwater transducer system comprising a plurality of spaced, tandemly associated fluid wave transducers, each of said transducers being mounted in a separate faired housing, means for moving said transducers in a given direction, said transducers being constructed and arranged to transmit fluid wave energy in a direction substantially parallel to the direction of movement, and a pair of spaced, parallel conductor carrying tubes each connected to each of said faired housings and to said transducer moving means.

* * * * *